United States Patent

Narang et al.

[11] 3,888,950
[45] June 10, 1975

[54] ARYLMERCAPTOETHYL PHOSPHATES

[75] Inventors: Saran A. Narang, Ottawa, Ontario, Canada; Surinder K. Dheer, King of Prussia, Pa.; Robert H. Wightman, Ottawa, Ontario, Canada

[73] Assignee: Canadian Patents and Development Limited, Ottawa, Ontario, Canada

[22] Filed: Mar. 23, 1973

[21] Appl. No.: 344,237

[52] U.S. Cl. ............ 260/933; 252/182; 260/211.5; 260/949
[51] Int. Cl. ............................................. C07f 9/08
[58] Field of Search ........................... 260/933, 949

[56] References Cited
UNITED STATES PATENTS
3,413,258  11/1968  Braus et al. .................... 260/949 X OTHER PUBLICATIONS
Index Chemicus, 26, 83821-2, (1967).

*Primary Examiner*—Anton H. Sutto
*Assistant Examiner*—Richard L. Raymond
*Attorney, Agent, or Firm*—Alan A. Thomson

[57] ABSTRACT

Aromatic mercapto phosphate compounds are provided having the formula:

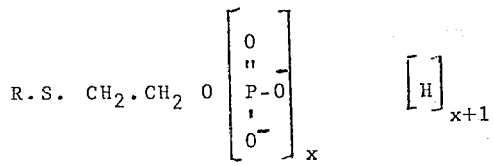

where $R$ = aryl,
and $x$ = 1, 2 or 3.

These aryl mercapto compounds, in conjunction with a dehydrating-condensing agent are very effective phosphorylating agents for complex organic hydroxyl compounds e.g. nucleotides. The phosphorylated product is readily-separated from the aromatic materials by chromatography. This reagent and procedure are advantageous for synthesizing polynucleotides of desired sequence.

3 Claims, No Drawings

ARYLMERCAPTOETHYL PHOSPHATES

This invention is directed to the phosphorylation of complex organic compounds containing hydroxyl groups particularly nucleotides. Novel aromatic mercapto phosphate compounds and reagent compositions are provided for this purpose.

The phosphorylating agents are capable of transferring the phosphoryl group in free or esterified form. In synthesizing nucleotides or phosphoprotein molecules of defined amino acid sequence, it is necessary to introduce phosphate groups repeatedly at defined locations. Purification of the reaction mixture can become very time consuming and laborious unless a simple technique is available. The phosphorylating agents of the invention not only allow ready introduction of mono-, di-, or tri-phosphate groups but also permit ready separation of unused reagent or by-products by controlled adsorption on selected solid phase materials.

The phosphorylation has been described generally by Tener in J. Amer. Chem. Soc. 83, 159 (1959) using basic solvents such as pyridine, picoline, lutidine or the like or mixed solvents containing such basic solvents. Phosphate esters which are readily cleaved by a base have been employed as phosphorylating agent and one group of such compounds has the formula:

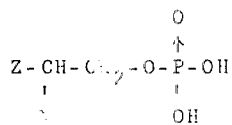

where Y is hydrogen or lower alkyl and Z is a strongly electro-negative substituent of which many types have been suggested. A nitrile group has been the preferred Z. The phosphate ester is used in conjunction with a dehydrating agent.

Purification of phosphorylated product has required many steps such as extraction, precipitation in the form of insoluble phosphate salts, absorption and desorption on resins and the like before carrying on to the next stage.

An object of our invention is to provide phosphorylating compounds (and reagent compositions) which give optimum phosphorylation and at the same time allow simpler and more effective purification of product to be carried out.

According to the invention, we have found that the following novel aryl mercapto phosphorylating compounds are very effective in conjunction with selected dehydrating agents, and allow simpler and more rapid purification of product to be effected by chromatography.

The novel aryl mercapto phosphates have the following structural formula:

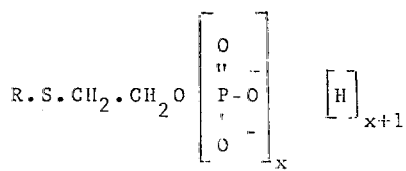

where $R$ = aryl, and $x$ = 1, 2 or 3

The exact nature of the aryl group is not critical as long as it is of strongly aromatic character and allows good solubility in the phosphorylation medium. Phenyl and substituted phenyl groups are usually employed. For effective phosphorylation, it was found that the mercapto group should be two carbon atoms removed from the phosphate. Suitable aryl mercapto-ethyl hydrogen phosphates include 2-phenylmercaptoethanol hydrogen phosphates, p-methoxyphenylmercapto-ethyl hydrogen phosphates, and tolylmercapto-ethyl hydrogen phosphates.

The selected dehydrating-condensing agents for use in conjunction with the aryl phosphates include alkyl- or aryl-substituted carbodimides, imidazole, substituted imidazoles, and 1,1-carbonyldiimidazole. Instead of the imidazoles, the aromatic sulfonyl chlorides such as p-toluene-sulfonyl chloride may be useful. Still other agents which may be used are trichloroacetonitrile, carboxylic acid chlorides, alkyl and aryl isocyanates, ethoxyacetylene and the like. These dehydrating-condensing agents are used in at least about equimolar amounts with the two reactants. Excess can be used but as long as there is sufficient to combine with the $H_2O$ released there would be no advantage.

A solvent in which the phosphate compound and the dehydrating-condensing agent are soluble is used for the reaction, and may also be used as a carrier for the combined reagent before use. Suitable solvents are basic anhydrous organic liquids including pyridine, picoline, lutidine or the like. Composite solvents such as dioxane, dimethylformamide, or tetrahydrofuran, mixed with the above basic solvents or with trialkylamines may be used.

The phosphorylating agent will comprise the mono-, di-or triphosphate ester for introduction of mono-, di-, or triphosphate groups respectively. These phosphate compounds may be prepared by treating a mixture of the aryl mercapto-ethanol and orthophosphoric acid in an anhydrous aprotic solvent with one of the above dehydrating-comdensing agents e.g. trichloroacetonitrile. The aromatic alcohol is then removed, suitably by extraction and the aromatic monophosphate isolated e.g. by chromatography. The diphosphate may then be prepared by treating the monophosphate with orthophosphoric acid in a solvent containing the dehydrating — condensing agent in catalytic amount and recovering the diphosphate e.g. by chromatography. The triphosphate may be prepared by treating the monophosphate with pyrophosphate in a solvent with the dehydrating-condensing agent. The triphosphate is isolated suitably by chromatography.

Phosphorylation is carried out by incorporating the aryl mercapto-ethyl phosphate, the dehydrating-condensing agent (preferably the imidazoles or aromatic sulfonyl chlorides) and the nucleotide or similar compound into the basic anhydrous organic solvent; condensing the phosphate compound and nucleotide to attach the substituted phosphate group; recovering the phosphorylated product from reactants and by-products; cleaving off the protective aromatic-mercapto group with oxidation and hydrolysis; and isolating the phosphorylated product.

In order to cleave the protecting aryl mercaptoethyl group it is necessary to oxidize the sulfur linkage to sulfoxide (suitably with a peroxy compound) and then to hydrolyze with strong base. It is necessary to form the sulfoxide before cleavage will be accomplished. The unoxidized aryl mercapto-ethyl group itself is remarkably stable.

The recovery and isolation of phosphorylated product are advantageously carried out by chromatography suitably initially on e.g. an aromatic DEAE cross-linked dextran to remove inorganic phosphate, followed by final purification on a DEAE cross-linked dextran. Suitable cross-linked dextrans are those designated "Sephadex" (trademark). Other purification techniques may be used including initial chromatography on cellulose. However a feature of this invention is that the compounds with aromatic groups are strongly bound by an aromatic derivative of DEAE cross-linked dextran such as benzoylated DEAE-Sephadex (BD-Sephadex). The aromatic moeity from the phosphorylating agent or from cleavage can be easily adsorbed and separated from the phosphorylated product, on elution e.g. with TEAB (triethylammonium bicarbonate). This feature is illustrated in the Examples.

The aromatic 2-mercaptoethanol compounds have been found to be strongly bound by cross-linked dextran itself. Aromatic phosphorylating agents without the mercapto group were not so strongly bound. This permits the use of Sephadex itself for the chromatography. However in the larger di- and tri-phosphate compounds the effect of the S atom is less than desired and it is advantageous to use the aromatic cross-linked dextran for at least one stage.

The following Examples are illustrative:

EXAMPLE I

Preparation of Aromatic Monophosphate Ester

The aromatic monophosphate reagents were prepared by treating a mixture of the aromatic mercaptoethanol (15 equivalents) and orthophosphoric acid (1 equivalent) in anhydrous dimethylformamide DMF (about 2 ml per mole of orthophosphoric acid) with trichloroacetonitrile (same volume as that of DMF). The reaction mixture was then dissolved in ethyl acetate and extracted several times with 0.2M TEAB buffer pH 7.1. The combined extract was re-extracted with ethyl acetate to ensure complete removal of aromatic mercaptoethanol. The pure aromatic monophosphate ester was isolated by successive chromatography, first on benzoylated DEAE-Sephadex (BD-Sephadex) to remove uncombined phosphate, followed by anion exchange chromatography on DEAE-Sephadex (A-25) to separate any diphosphate ester (1–2%). Yield was 25% based on the orthophosphoric acid component. For 2-phenylmercaptoethyl monophosphate the extinction coefficient $\epsilon$ max at 240 m$\mu$ was 11,418. These phosphate compounds are amorphous and non-crystalline.

EXAMPLE II

Preparation of Aromatic Diphosphate Ester

The aromatic diphosphorylating reagents were prepared by treating an equimolar mixture of aromatic monophosphate ester and orthophosphoric acid in rigorously dried dimethylformamide or hexamethylphosphorotriamide with an equimolar amount of 1,1-carbonyldiimidazole. The aromatic diphosphorylated compound was isolated by successive chromatography on BD-Sephadex to remove inorganic or uncombined phosphate, followed by anion-exchange chromatography on DEAE-Sephadex (A-25). Yield was about 50% (based on the monophosphate ester).

EXAMPLE III

Preparation of Aromatic Triphosphate Ester

The aromatic triphosphorylating reagent was prepared by treating an equimolar mixture of aromatic monophosphate ester and pyrophosphoric acid in anhydrous dimethylformamide (or hexamethylphosphorotriamide) with a catalytic amount of 1,1-carbonyldiimidazole. The pure aromatic triphosphate was isolated by chromatography on BD-Sephadex to remove the inorganic pyrophosphate followed by anion-exchange chromatography on DEAE-Sephadex (A-25).

EXAMPLE IV

Synthesis of Thymidine-5'-0-monophosphate

Thymidine-3'0-acetate (0.042 mM; 400 O.D.$_{267}$) (10 molar proportions), 2-phenylmercaptoethyl monophosphate (0.050 mM) were together dried by repeated evaporation with dry pyridine in vacuum. The dried material in pyridine was treated with triisopropylbenzenesulfonyl chloride (TPS) (0.042 mM) for 12 hrs. after which the blocking group from the phosphorylated material was removed by sequential treatment with sodium periodate and 2N NaOH. The reaction mixture was neutralized with Dowex (trademark) 50-W × 8 resin in pyridinium form. TLC of the crude mixture on 100 $\mu$ Avicel (trademark) cellulose plates in isobutyric-ammonia-0.1 M EDTA (100: 60: 1.6; v/v) system showed total utilization of thymidine thereby suggesting a nearly quantitative reaction. The material was purified from any remaining monophosphorylating agent by chromatography on a BD-Sephadex column preequilibrated with 0.05 M TEAB (pH = 7.5). Thymidine-5'-0-phosphate was eluted with 0.005 M TEAB in the early fractions. Thymidine-5'-0-monophosphate can be further purified by DEAE-Sephadex chromatography from which the product elutes essentially as a single peak.

EXAMPLE V

Synthesis of Thymidine-5'-0-diphosphate

Thymidine-3'-0-acetate (0.042 mM, 400 O.D.$_{267}$) and 2-phenylmercaptoethyl-1-diphosphate (0.050 mM) were dried and treated with TPS (equimolar) under the conditions mentioned above. During treatment of the reaction mixture with periodate and 2N NaOH, 2-phenylmercaptoethyl-diphosphate was also hydrolyzed. TLC of the crude reaction mixture in isobutyricammonia-0.1 M EDTA system (100: 60: 1.6; v/v) essentially showed a single nucleotide-containing spot. The mixture after neutralization was applied to a BD-Sephadex column and eluted with TEAB (pH = 7.5) buffer gradient, 0.01 M – 0.40 M. Thymidine-5'-0-diphosphate was eluted along with inorganic phosphate in the early fractions and the product was isolated after chromatography on DEAE-Sephadex (A-25). Thymidine-5'-0-diphosphate eluted with 0.30 M TEAB as a single peak.

EXAMPLE VI

Synthesis of Thymidine-5'-0-triphosphate

Thymidine-3'-0-acetate (0.01 mM) was converted to thymidine-5'-0-triphosphate with 2-phenylmercaptoethyl-triphosphate according to the conditions mentioned in Example V for thymidine-5'-

0-diphosphate. The product was further purified by either preparative TLC (for small amounts e.g. on cellulose plates) or DEAE-Sephadex (A-25) column chromatography.

EXAMPLE VII

Synthesis of Deoxyadenosine-5'-0-monophosphate and Deoxyguanosine-5'-0-monophosphate An anhydrous pyridine solution (10 ml) of N6,3'-0-diacetylated deoxyadenosine (0.2 mmole) and 2-phenylmercaptoethanol monophosphate (0.2 mmole) was treated with TPS (0.3 mmole) for 12 hr. After decomposing the reaction mixture with aqueous pyridine, the blocking groups were removed by sequential treatment with sodium periodate (aqueous-5 molar) and 2N sodium hydroxide. The desired material was purified from any remaining monophosphating agent by chromatography on a BD-Sephadex column preequilibrated with 0.05M TEAB buffer pH 7.1. Deoxyadenosine 5'-0-monophosphate was further purified by DEAE-Sephadex chromatography which eluted the product essentially as a single peak.

An anhydrous pyridine solution (10 ml) of N, 3'-0-diacetylated deoxyguanosine (0.3 mmole), 2-phenylmercaptoethanol monophosphate (0.4 mmole) was treated with TPS (0.5 mmole) for 12 hr. The mixture was treated as just described and the desired product was separated as before. Deoxyguanosine 5'-0-monophosphate was finally purified by DEAE-Sephadex chromatography which eluted the product essentially as a single peak.

EXAMPLE VIII

Retention of 2-phenylmercaptoethyl derivatives (on Sephadex Chromatography)

A mixture of thymidine-5'-phosphate its 2-phenylmercaptoethyl diester and the corresponding sulfoxide derivative were chromatographed on Sephadex G-25 superfine cross-linked dextran using 0.1 N TEAB buffer. Thymidine-5'-phosphate and the "Sulfoxide" diester were eluted first, essentially as one peak (N.B. — they could be easily differentiated by cellulose TLC using any of the common solvent systems). A second peak contained the pure "sulfide" diester. This retention is apparently not due to molecular weight differences since the sulfide diester and the sulfoxide diester have essentially the same molecular weight. It must therefore be due to some attractive interaction between the "free electron pairs" of the sulfur and the Sephadex. This property of 2-phenylmercaptoethyl derivatives of nucleotides is useful for purification of materials during nucleotide synthesis.

Phosphate derivatives of phenylhydracrylamide and p-methoxyphenylhydracrylamide have been investigated and do not exhibit any enhanced binding properties with Sephadex.

The p-methoxyphenylmercaptoethyl phosphates have been used as phosphorylating agents according to Examples IV–VIII with equivalent results.

We claim:

1. Aryl mercaptoethylphosphate compounds having the following structural formula:

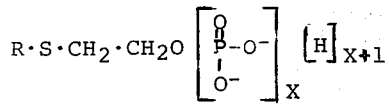

where $R$ = phenyl, or methoxy- substituted phenyl, or tolyl, and $x = 1$, 2 or 3.

2. The compounds of claim 1 where $R$ = methoxy-substituted phenyl or tolyl.

3. The compounds of claim 1 where $R$= phenyl.

* * * * *